US007865445B2

(12) United States Patent
Maeda

(10) Patent No.: US 7,865,445 B2
(45) Date of Patent: Jan. 4, 2011

(54) INFORMATION PROCESSING METHOD, INFORMATION PROCESSING APPARATUS, COMPUTER PROGRAM AND STORAGE MEDIUM

(75) Inventor: Kenji Maeda, Yokohama (JP)

(73) Assignee: Canon Kabushiki Kaisha (JP)

( * ) Notice: Subject to any disclaimer, the term of this patent is extended or adjusted under 35 U.S.C. 154(b) by 41 days.

(21) Appl. No.: 11/782,017

(22) Filed: Jul. 24, 2007

(65) Prior Publication Data

US 2008/0027742 A1    Jan. 31, 2008

(30) Foreign Application Priority Data

Jul. 27, 2006   (JP)   ............... 2006-205314

(51) Int. Cl.
G06F 7/04 (2006.01)
G06F 17/30 (2006.01)
H04N 7/16 (2006.01)
G06Q 40/00 (2006.01)
G07D 11/00 (2006.01)
G07F 19/00 (2006.01)
G06K 5/00 (2006.01)

(52) U.S. Cl. ..................... 705/59; 726/26; 235/379; 235/380

(58) Field of Classification Search ............... 705/1–79; 726/26; 235/379, 380
See application file for complete search history.

(56) References Cited

U.S. PATENT DOCUMENTS

| | | | | |
|---|---|---|---|---|
| 4,937,863 A | * | 6/1990 | Robert et al. ............... | 710/200 |
| 5,204,897 A | * | 4/1993 | Wyman ....................... | 710/200 |
| 5,745,879 A | * | 4/1998 | Wyman ....................... | 705/1 |
| 5,758,069 A | * | 5/1998 | Olsen .......................... | 726/27 |
| 6,460,140 B1 | * | 10/2002 | Schoch et al. ............... | 726/22 |
| 7,013,294 B1 | * | 3/2006 | Sekigawa et al. ........... | 705/59 |
| 7,063,253 B1 | * | 6/2006 | Brausch et al. ............. | 235/379 |
| 7,225,165 B1 | * | 5/2007 | Kyojima et al. ............. | 705/59 |
| 2002/0164025 A1 | * | 11/2002 | Raiz et al. ................... | 380/231 |
| 2002/0194010 A1 | * | 12/2002 | Bergler et al. .............. | 705/1 |
| 2003/0005153 A1 | * | 1/2003 | Carbonell .................... | 709/239 |
| 2005/0021992 A1 | * | 1/2005 | Aida et al. ................... | 713/200 |
| 2005/0108566 A1 | | 5/2005 | Minogue et al. | |
| 2006/0136343 A1 | * | 6/2006 | Coley et al. ................ | 705/59 |
| 2007/0198427 A1 | * | 8/2007 | Vajjiravel et al. ........... | 705/59 |

FOREIGN PATENT DOCUMENTS

| | | |
|---|---|---|
| JP | 2002-215253 A | 7/2002 |
| JP | 2005-025616 A1 | 1/2005 |
| JP | 2005-327196 A | 11/2005 |
| WO | 2004/019182 A2 | 3/2004 |

OTHER PUBLICATIONS

European Search Report issued in corresponding EP Patent Application 07113357.3, mailed on Nov. 12, 2007.

* cited by examiner

*Primary Examiner*—Evens J Augustin
*Assistant Examiner*—Murali Dega
(74) *Attorney, Agent, or Firm*—Rossi, Kimms & McDowell LLP

(57) ABSTRACT

An information processing method for managing issuance of a license that controls an operation of a device and a function of an application to be installed in the device determines whether issuance of a unified license that unifies licenses for making the application operable in a plurality of devices is requested. The unified license is issued based on a combination of the devices identified by the device serial information and the application identified by the license access information, if determined that issuance of the unified license is requested.

11 Claims, 17 Drawing Sheets

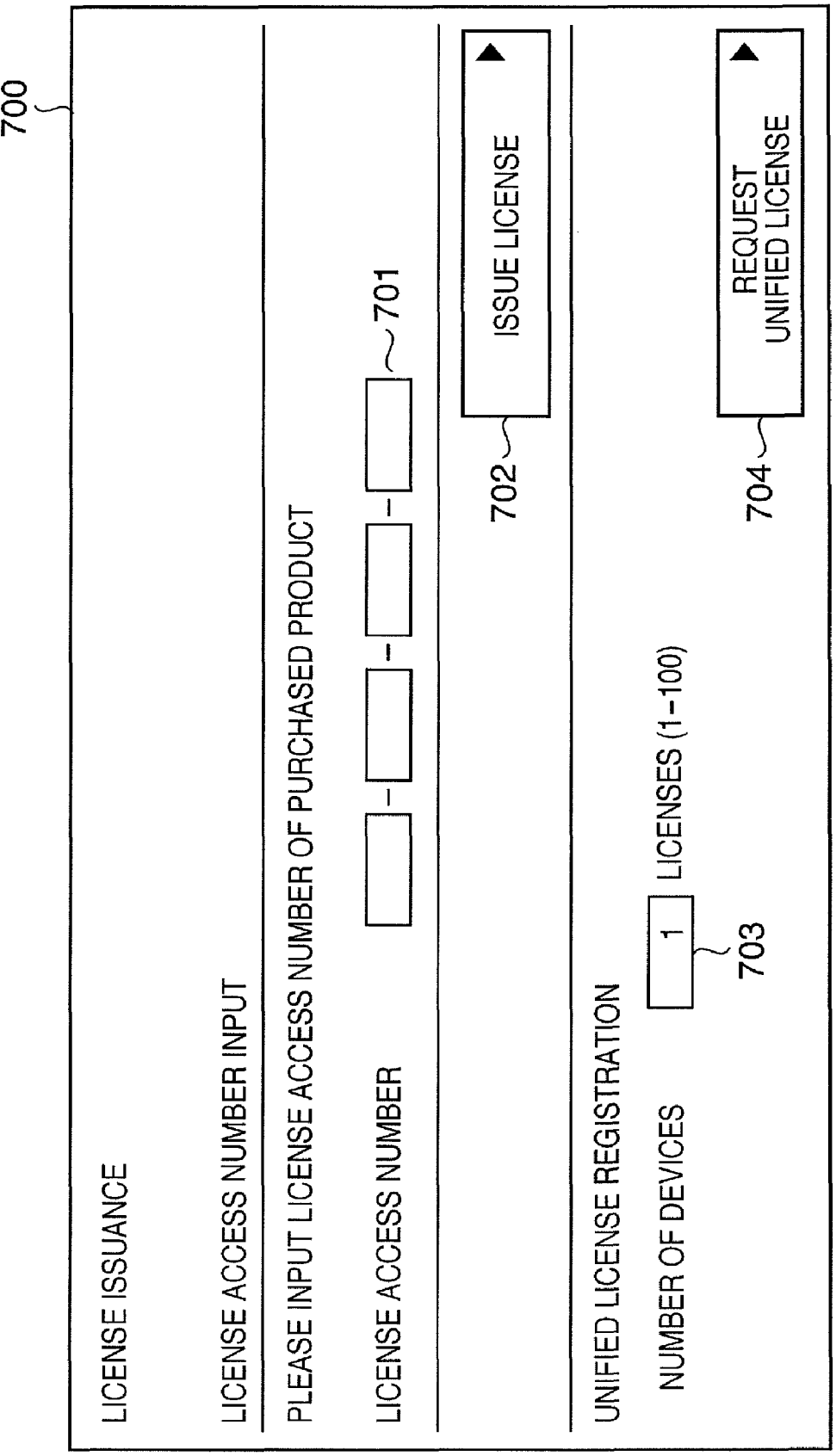

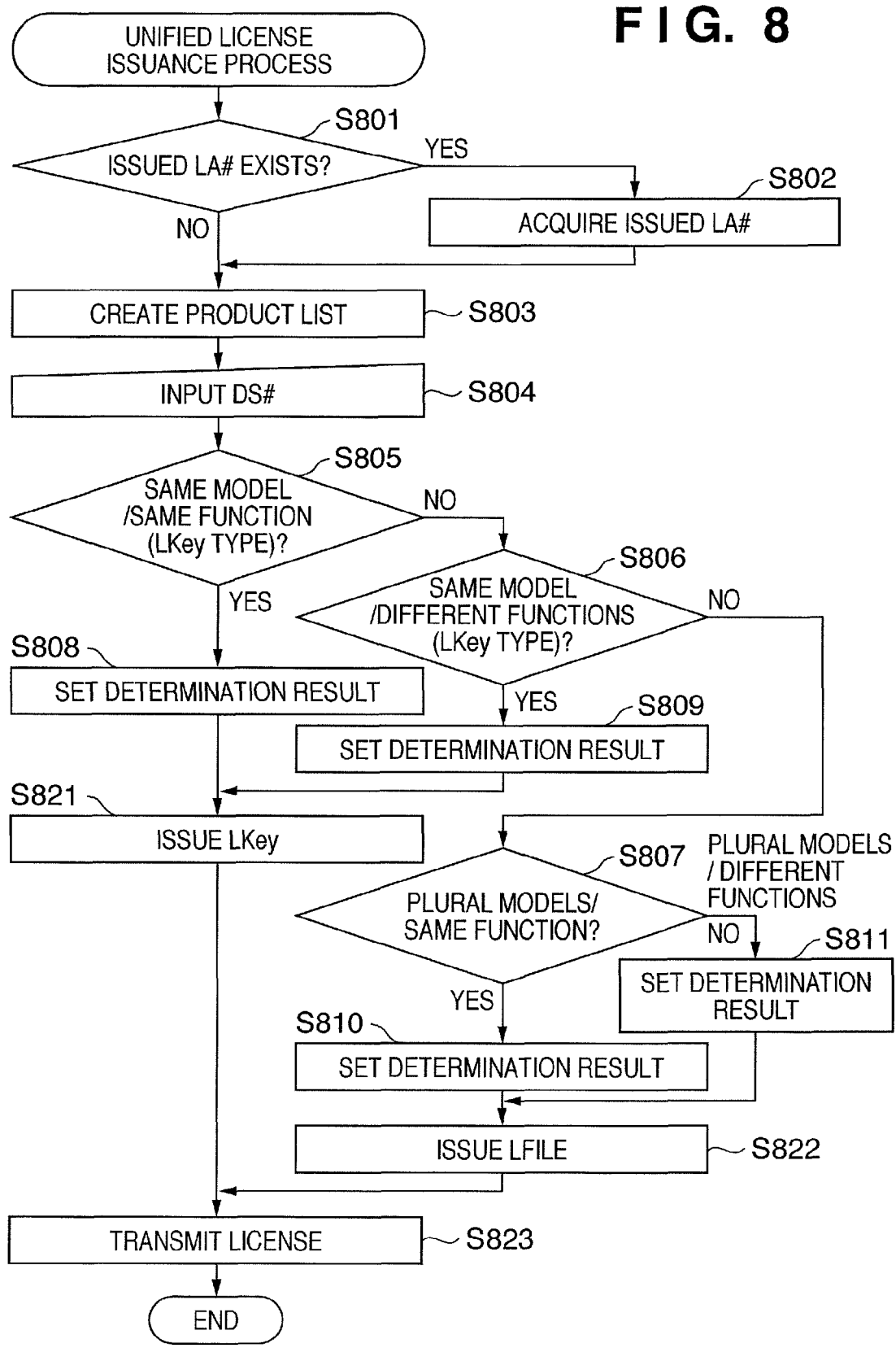

FIG. 9

```
LICENSE ISSUANCE

SERIAL NO. REGISTRATION

XXXXXXXXXXXXXXXXXXXXXXXXXXXXXXXXXXXXX

PRODUCT CATEGORY         iR/imageRUNNER
    APPLICATION PRODUCT NAME  maeda-test
    APPLICATION PRODUCT CODE  9998A001

PLEASE INPUT SERIAL NUMBER OF iR DEVICE WITH WHICH THE PRODUCT WILL BE USED.

DEVICE SERIAL NO. INPUT
    DEVICE SERIAL NO. [      ]~911
    CONFIRMATION      [      ]~912

XXXXXXXXXXXXXXXXXXXXXXXXXXXXXXXXXXX

[◀ BACK]
```
⎫
⎬ 901
⎭

```
SERIAL NO. REGISTRATION

XXXXXXXXXXXXXXXXXXXXXXXXXXXXXXXXXXXXX

PRODUCT CATEGORY         iR/imageRUNNER
    APPLICATION PRODUCT NAME  maeda-test
    APPLICATION PRODUCT CODE  9998A001

PLEASE INPUT SERIAL NUMBER OF iR DEVICE WITH WHICH THE PRODUCT WILL BE USED.

DEVICE SERIAL NO. INPUT
    DEVICE SERIAL NO. [      ]~914
    CONFIRMATION      [      ]~915

XXXXXXXXXXXXXXXXXXXXXXXXXXXXXXXXXXX

[◀ BACK]
```
⎫
⎬ 902
⎭

913 ~ [ ISSUE UNIFIED LICENSE ▶ ]

LICENSE ISSUANCE

LICENSE KEY ISSUANCE COMPLETED

A LICENSE KEY HAS BEEN ISSUED. PLEASE REGISTER THE LICENSE KEY IN THE DEVICE.

LICENSE KEY ISSUE DATE : <2004/05/11 14:50:06)JST>

UNIFIED LICENSE KEY : 00-XXXX-XXXX-XXXX ~1001

UNIFIED LICENSE ACCESS NO. (LA#) : 1234-5678-1234-1234 ~1002

* XXXXXXXXXXXXXXXXXXXXXXXXXXXXXXXXXXXXXX

PRINTABLE FORMAT

FIG. 12A

| | D7 | D6 | D5 | D4 | D3 | D2 | D1 | D0 |
|---|---|---|---|---|---|---|---|---|
| Byte1 | ID INFORMATION<br>0 : CONVENTIONAL<br>1 : COMMON OPERATION | | SET CONTROL INFORMATION (ID=0, 1, 2, 3···) | | | | | |
| Byte2 | ABBREVIATED DEVICE NO. 1 | | | | | | ABBREVIATED DEVICE NO. 2 | |
| Byte3 | ABBREVIATED DEVICE NO. 3 | | | | | | ABBREVIATED DEVICE NO. 4 | |

F I G. 12B

| D5-D0 | OPERATION | PERMITTED APPLICATION FUNCTIONS |
|---|---|---|
| 1201 { CONTROL INFORMATION ID=0 | ALL (CATEGORIES 1, 2, 3) | HDD UTILITY, PDF, ENCRYPTION, COPY-FORGERY-INHIBITED PATTERN AUTHENTICATION |
| 1202 { CONTROL INFORMATION ID=1 | CATEGORY 1 ON | HDD UTILITY |
| 1203 { CONTROL INFORMATION ID=2 | CATEGORY 2 ON | HDD UTILITY, PDF |
| 1204 { CONTROL INFORMATION ID=3 | CATEGORY 3 ON | HDD UTILITY, PDF, ENCRYPTION |
| ... | | |

FIG. 13

| | |
|---|---|
| ⋮ | ⋮ |
| APPLICATION A | ID=APPLICATION AXXXXXXX, DS#=DEVICE 1XXXXXX |
| APPLICATION B | ID=APPLICATION BXXXXXXX, DS#=DEVICE 1XXXXXX |
| OPTION D | ID=CATEGORY XXXX DS#=DEVICE 1XXXXXX |
| APPLICATION B | ID=APPLICATION BXXXXXXX, DS#=DEVICE 3XXXXXX |
| APPLICATION C | ID=APPLICATION CXXXXXXX, DS#=DEVICE 2XXXXXX |
| ⋮ | ⋮ |

FIG. 14A

| | D7 | D6 | D5 | D4 | D3 | D2 | D1 | D0 |
|---|---|---|---|---|---|---|---|---|
| Byte1 | ID INFORMATION<br>0 : CONVENTIONAL<br>1 : COMMON OPERATION | | SET CONTROL INFORMATION (ID=0, 1, 2, 3, ···) | | | | | |
| Byte2, 3 | DS#1 | | | | | | | |
| Byte4, 5 | DS#2 | | | | | | | |
| Byte5, 6 | DS#3 | | | | | | | |
| Byte7, 8 | DS#4 | | | | | | | |

F I G. 14B

| | D7 | D6 | D5 | D4 | D3 | D2 | D1 | D0 |
|---|---|---|---|---|---|---|---|---|
| Byte1 | ID INFORMATION<br>0 : CONVENTIONAL<br>1 : COMMON OPERATION | | | | | | | |
| Byte2 | ABBREVIATED DEVICE NO.1 | | | | CONTROL INFORMATION ID=0 | | | |
| Byte3 | ABBREVIATED DEVICE NO.2 | | | | CONTROL INFORMATION ID=1 | | | |
| Byte4 | ABBREVIATED DEVICE NO.3 | | | | CONTROL INFORMATION ID=2 | | | |
| Byte5 | ABBREVIATED DEVICE NO.4 | | | | CONTROL INFORMATION ID=3 | | | |

F I G. 15
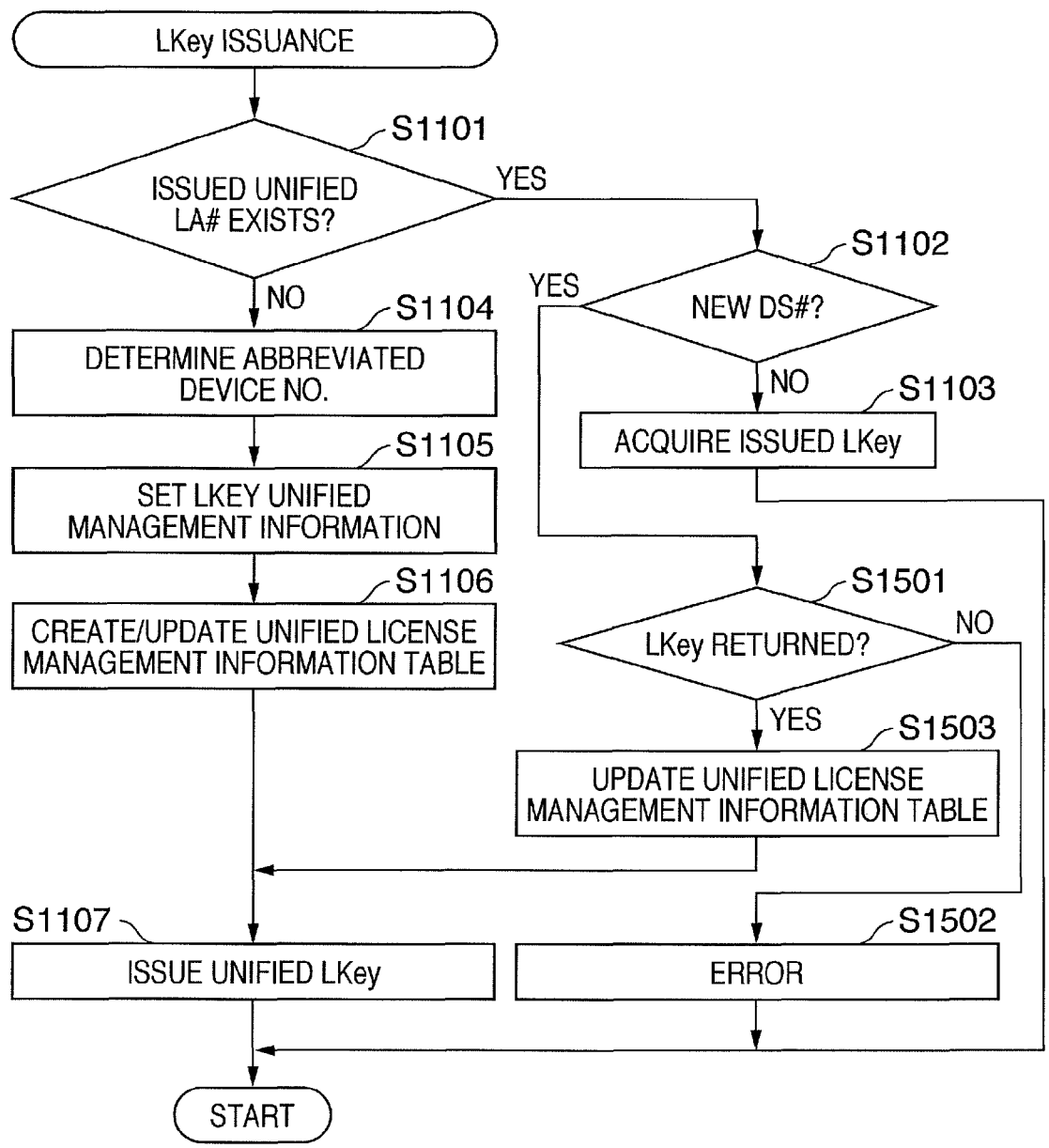

INFORMATION PROCESSING METHOD, INFORMATION PROCESSING APPARATUS, COMPUTER PROGRAM AND STORAGE MEDIUM

BACKGROUND OF THE INVENTION

1. Field of the Invention

The present invention relates to an information processing technique for unified management of licenses that make application programs operable.

2. Description of the Related Art

Conventionally, it is accepted practice to assign licenses for making application programs operable to bona fide purchasers, in order to avoid unauthorized use of application programs.

Assigning a license normally involves issuing one piece of license information (license key) per application program (hereinafter, simply "application") Installation of an application in a device such as a printer is only possible when the number input by the user matches the license key number.

One form of issuing a license key and installing an application involves, for example, applying to the application developer for issuance of a key number, which is then input as a license key when installing an application.

There are also licenses known as site licenses and corporate licenses. These make it possible to install a single application in a predetermined number of devices where the application is purchased by a business or the like.

A method has also been proposed that involves generating a plurality of license keys from a plurality of pieces of program information and a single piece of apparatus identification (ID) information, and generating a license key packaged from the plurality of generated license keys (e.g., see Japanese Patent Laid-Open No. 2002-215253).

Further, a method has been proposed that involves generating a single license file for a plurality of devices (e.g., see Japanese Patent Laid-Open No. 2005-327196).

However, while the above conventional techniques enable set license keys to be issued, the configuration of the license keys cannot be freely changed.

Problems due to manual management also arise when installing applications in large users. For example, not only is a commensurate amount of time required to input license keys due to manual management, but human error occurs in the form of incorrectly input license keys.

The present invention, which was made in consideration of the above problems, has as its object to provide an information processing technique that makes it possible to unify the issuance of license keys or license files according to device model and application function.

A further object of the present invention is to provide an information processing technique that eliminates both the time required to input data due to manual management and input errors by downloading unified license keys and unified license files to devices.

SUMMARY OF THE INVENTION

According to one aspect of the present invention, there is provided an information processing method for managing issuance of a license that controls an operation of a device and a function of an application to be installed in the device, comprising:

an application information input step of inputting license access information for identifying the application in order to issue the license;

a determining step of determining whether issuance of a unified license that unifies licenses for making the application operable in a plurality of devices is requested;

a device information input step of inputting device information for identifying the plurality of devices; and a license issuing step of issuing the unified license based on a combination of the devices identified by the device information and the application identified by the license access information, if it is determined in the determining step that issuance of the unified license is requested.

According to another aspect of the present invention, there is provided an information processing apparatus for managing issuance of a license that controls an operation of a device and a function of an application to be installed in the device, comprising:

an application information input unit adapted for input of license access information for identifying the application in order to issue the license;

a determining unit adapted to determine whether issuance of a unified license that unifies licenses for making the application operable in a plurality of devices is requested;

a device information input unit adapted for input of device information for identifying the plurality of devices; and a license-issuing unit adapted to issue the unified license based on a combination of the devices identified by the device information and the application identified by the license access information, if it is determined by the determining unit that issuance of the unified license is requested.

The present invention makes it possible to unify the issuance of license keys or license files according to device model and application function.

The present invention also enables both the time required to input data due to manual management and input errors to be eliminated by downloading unified license keys and license files to devices.

Further features of the present invention will become apparent from the following description of exemplary embodiments with reference to the attached drawings.

BRIEF DESCRIPTION OF THE DRAWINGS

FIG. 7 shows a screen used in license issuance according to an embodiment of the present invention.

FIG. 8 is a flowchart for illustrating the detailed processing flow for unifying licenses (S640) executed by the license-issuing unit 113 according to an embodiment of the present invention.

FIG. 9 illustrates a screen for inputting a plurality of device serial numbers according to an embodiment of the present invention.

FIG. 12A shows bit information used in an exemplary unified license key.

FIG. 12B illustratively shows the range of functions operable by devices and applications as a specific example of control information.

FIG. 13 illustrates the configuration of a unified license file resulting from the processing in step S822 of FIG. 8.

FIGS. 14A and 14B show variations of the unified license key configuration shown in FIG. 12A.

FIG. 15 is a flowchart for illustrating the processing flow for issuing a unified license key according to a second embodiment.

DESCRIPTION OF THE EMBODIMENTS

Hereinafter, preferred embodiments of the present invention will be illustratively described in detail, with reference to the drawings. The constituent elements described in these embodiments are, however, merely illustrative, and the intent is not to limit the scope of the invention only to these.

First Embodiment

Configuration of Information Processing System

Figure 1:
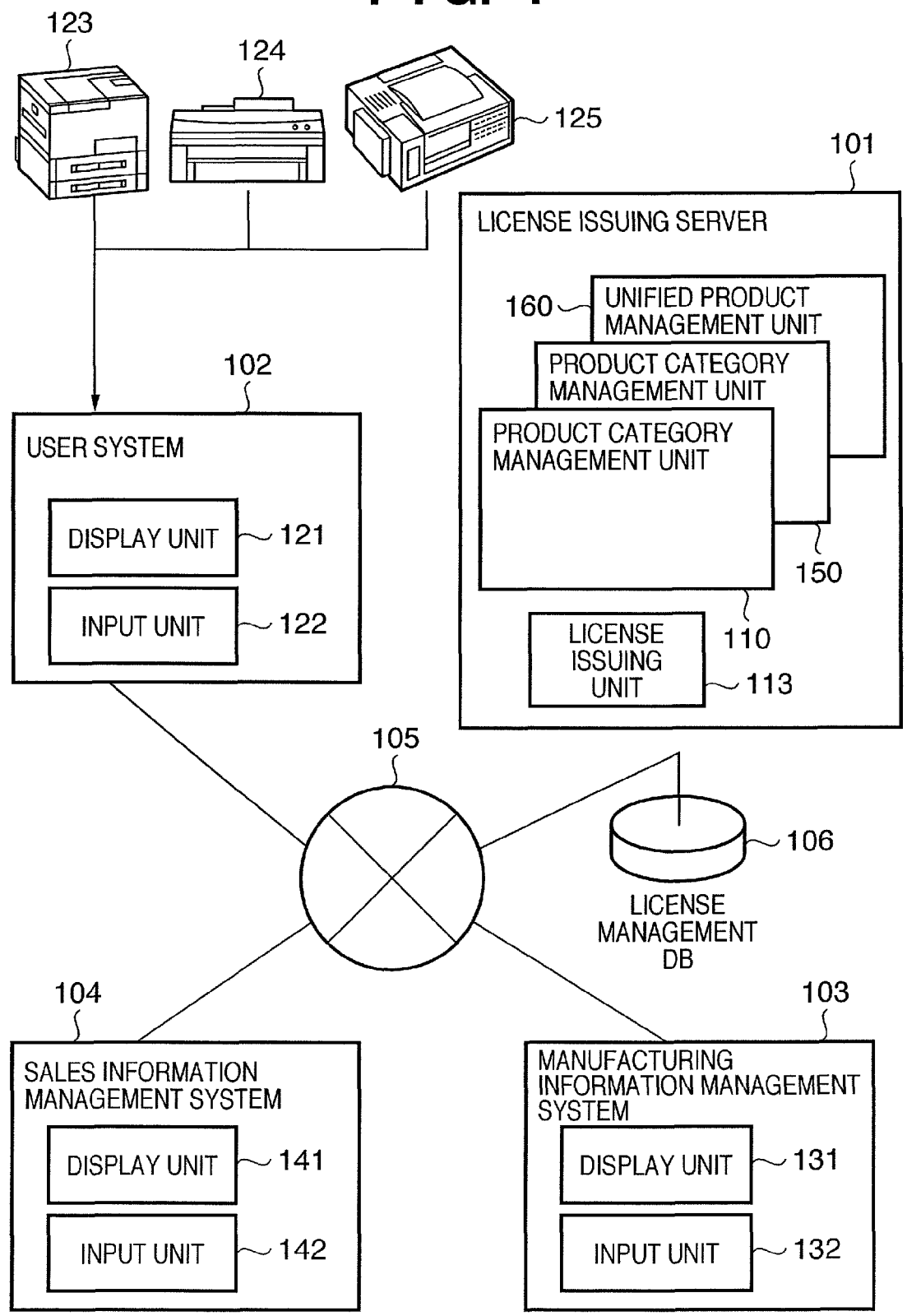
FIG. 1 shows the configuration of an information processing system according to an embodiment of the present invention.

FIG. 1 shows the configuration of an information processing system according to a preferred embodiment of the present invention. A license-issuing server 101 that functions as an information processing apparatus, a user system 102, a manufacturing information management system 103, and a sales information management system 104 are connected in a state enabling mutual transmission and reception of data via a network 105.

The information processing system can perform unified management of licenses that make application functions operable, in order to prevent unauthorized use of applications.

The license-issuing server 101 functions as an information processing apparatus that entirely administers information processing related to issuing and assigning licenses.

The user system 102 functions as an information processing system that administers information processing related to requesting licenses for network devices used by users such as printing apparatuses, for example, and setting issued licenses. The user system 102 is constituted by an information processing apparatus that can be connected to the network 105, such as a personal computer or a mobile terminal. The information processing apparatus constituting the user system 102 is able to set licenses issued by the license-issuing server 101 in network devices such as printing apparatuses 123, 124 and 125, for example, via the network 105.

Licenses can be supplied to the printing apparatuses 123, 124 and 125 from the license-issuing server 101 by, for example, supplying a plurality of licenses for a plurality of applications as a single license file. Also, a license access number for each application can be supplied as a license to a printing apparatus.

The license-issuing server 101 can manage licenses issued to the printing apparatuses 123, 124 and 125. License management involves, for example, managing the licenses of applications for operating the printing apparatuses 123, 124 and 125, and managing licenses relating to additional applications.

Note that the above license management is illustrative, and the intent of the present invention is, of course, not limited to this form of management.

The license-issuing server 101 can manage licenses for each printing apparatus, and is able to control unique functions for each printing apparatus by supplying licenses. The license-issuing server 101 is able to issue and supply licenses for making a group of printing apparatuses (specific number of devices) operable using a single license, and controlling device operations.

The license-issuing server 101 includes a product category management unit 110 that manages supply of license keys for applications. The license-issuing server 101 also includes a product category management unit 150 that manages supply of license files. The license-issuing server 101 further includes a unified product management unit 160 that manages licenses for making a group of printing apparatuses (specific number of devices) operable using a single license, and for controlling device operations.

The manufacturing information management system 103 manages manufacturing information used by the manufacturer of the printing apparatuses 123, 124 and 125 for managing the printing apparatuses 123, 124 and 125 as products.

The sales information management system 104 manages a variety of information relating to the seller that sold the printing apparatuses 123, 124 and 125 as products manufactured by the manufacturer, and the sale of the printing apparatuses 123, 124 and 125.

A license-management database (DB) 106 is connected to the license-issuing server 101. The license-management DB 106 stores option information, application information (including license key number (LKey#) information), license access number (LA#) information, device serial number (DS#) information, license files, and the like. The content of the license management DB 106 will be described in detail later with reference to FIGS. 3 to 5.

The network 105 is a communication line capable of bidirectional communication, such as the Internet.

In the information processing system according to the embodiments of the present invention, the license-issuing server 101 can receive manufacturing information and sales information relating to the printing apparatuses 123, 124 and 125 respectively from the manufacturing information management system 103 and the sales information management system 104.

When manufacturing information or sales information is received, the management units (110, 150, 160) register information relating to the printing apparatuses, customer information, and information relating to additionally purchased applications in the license-management DB 106.

A license-issuing unit 113 issues, via the sales information management system 104, license access numbers that enable access to applications to which a license has been assigned based on the information registered in the license-management DB 106.

The sales information management system 104 produces certificates that contain an acquired license access number. Under the management of the sales information management system 104, the seller sells to users a printing apparatus and a certificate printed with a license access number for use in acquiring a license.

To enable a user that purchased a printing apparatus to use application functions on the printing apparatus, a license issued by the license-issuing server 101 needs to be acquired. The license-issuing server 101 issues a license key or a license file in response to proper access from the user system 102 via the network 105.

Identification (ID) information identifying the installation destination, which is the printing apparatus 123, for example, and the functions of the application is embedded in the license key or the license file issued by the license-issuing server 101. Only an apparatus having the ID information embedded in the license key or license file is able to launch the option functions and the application.

That is, a different license is needed to launch the same application in another apparatus. Unauthorized use of applications can thereby be prevented.

To operate the printing apparatus 123, for example, as the installation destination, the user can directly access the license-issuing server 101 using the user system 102. The user is then able to acquire a license key or a license file in exchange for a license access number.

The user is able to directly input the acquired license via the operation panel of the printing apparatus on which the application is to be installed. Alternatively, the user can download the acquired license to the printing apparatus on which the application is to be installed via the user system 102.

Inputting (or downloading) a license enables an application to be used on the printing apparatus on which the application is to be installed. Here, the issuing of a license is described taking the printing apparatus 123 as an exemplary installation destination, although the intent of the present invention is, of course, not limited to this example. For example, the printing apparatuses 123, 124 and 125 can be made operable in a unified manner using a unified license issued by the license-issuing unit 113 of the license-issuing server 101. The specific processing relating to license issuance and unified license issuance will be described in detail later.

Schematic Configuration of License-Issuing Server 101

Figure 2:
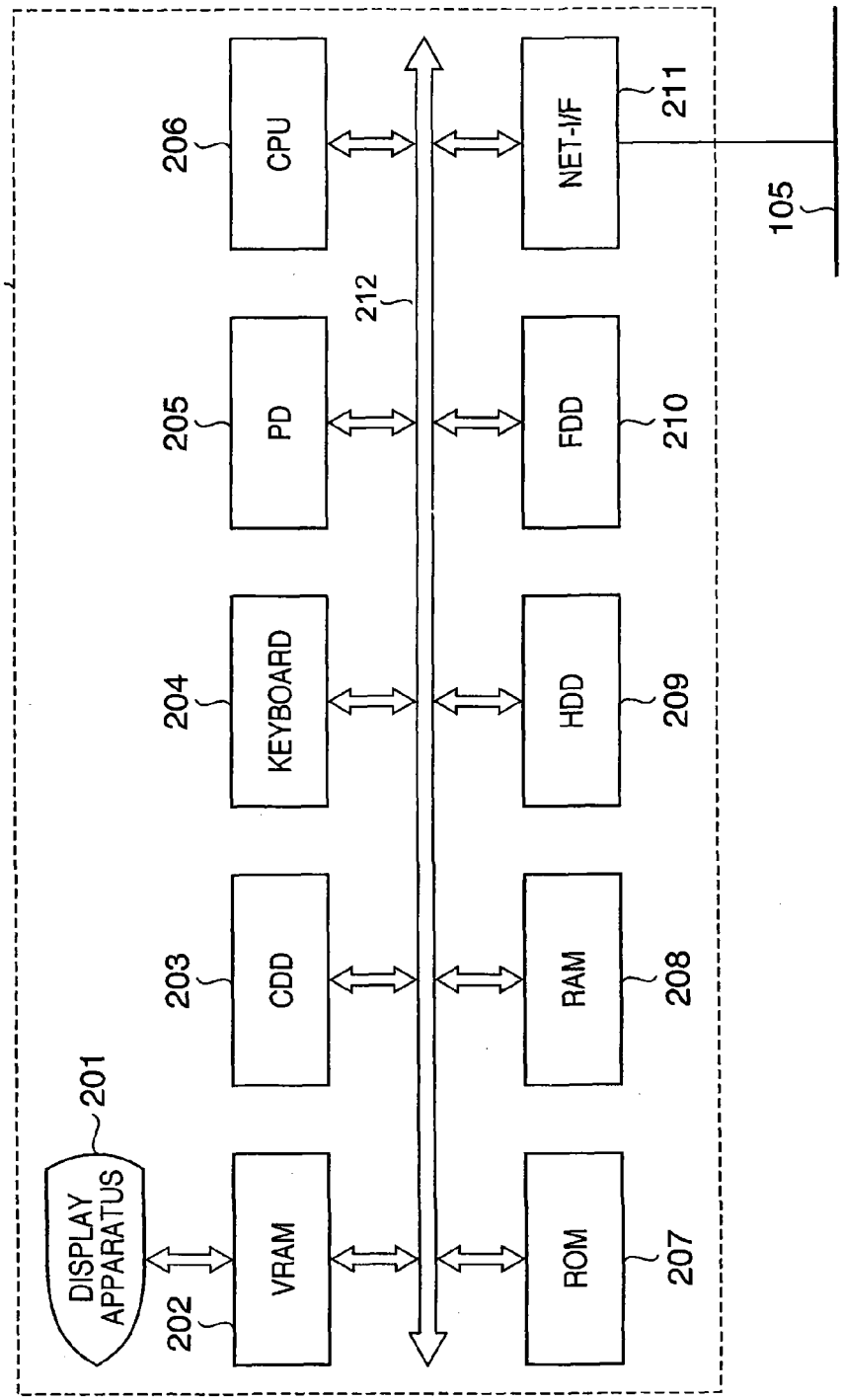
FIG. 2 is a block diagram showing a schematic configuration of a license-issuing server 101 according to an embodiment of the present invention.

FIG. 2 is a block diagram showing a schematic configuration of the license-issuing server 101.

In FIG. 2, a display apparatus 201 displays windows, icons, messages, menus, and other user interface information, for example, on a display screen thereof. A video random access memory (VRAM) 202 stores image data for display on the display apparatus 201. The image data stored in the VRAM 202 is transferred to the display apparatus 201 in accordance with prescribed regulations, and images are displayed on the display apparatus 201. A compact disk drive (CDD) 203 reads and writes various control programs and data from and to recording media such as CD-ROM and CD-R. The CDD 203 may be a DVD drive.

A keyboard 204 has various keys for inputting characters. A pointing device (PD) 205 is used for instructing icons, menu and other objects displayed on the display screen of the display apparatus 201, for example.

A central processing unit (CPU) 206 administers the overall operations of the license-issuing server 101.

Further, the control programs stored in the CDD 203 control devices connected via the CPU 206 and a CPU bus 212. A read only memory (ROM) 207 holds a variety of control programs and data. A random access memory (RAM) 208 includes a work area for the CPU 206, an area for saving data when error processing is performed, and an area for loading control programs.

A flexible disk drive (FDD) 210 and a hard disk drive (HDD) 209 function as storage apparatuses, and save various control programs and data.

A network interface (NET-I/F) 211 is able to communicate with the printing apparatus 123 and other information processing apparatuses via the network 105. The CPU bus 212 includes an address bus, a data bus and a control bus. Control programs can also be provided to the CPU 206 from the ROM 207, the HDD 209, the FDD 210 and the CDD 203, or from other information processing apparatuses via the network 105.

Note that a similar configuration to the hardware configuration of the license-issuing server 101 in FIG. 2 can be adopted with respect to information processing apparatuses constituting the user system 102, the manufacturing information management system 103 and the sales information management system 104.

License-Management DB 106

Figure 3:
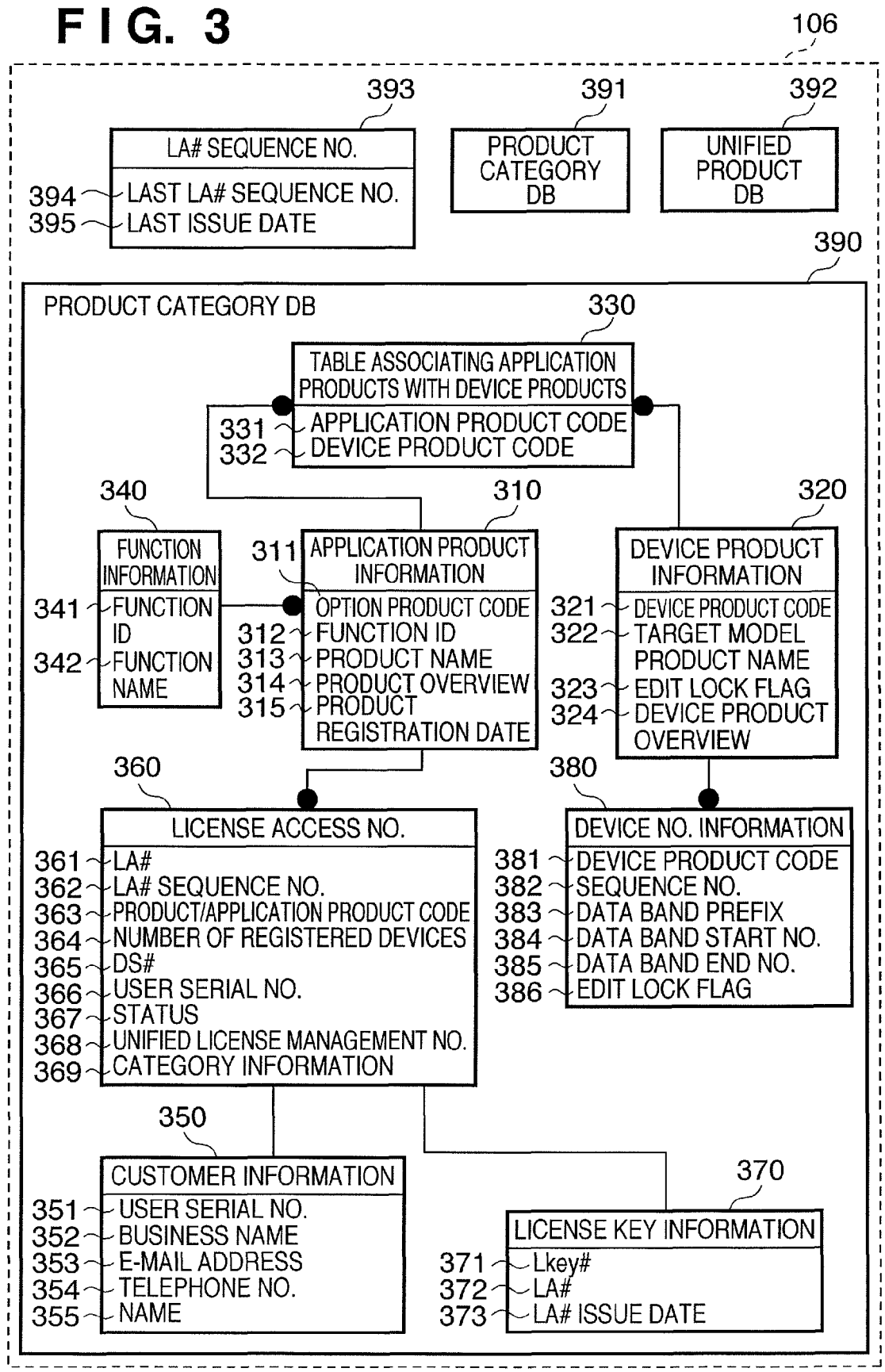
FIG. 3 illustrates in simplified form information stored in a license-management DB 106 according to an embodiment of the present invention.

FIG. 3 illustrates in simplified form information stored in the license-management UB 106. The license-management DB 106 has a product category database (DB) 390 that corresponds to the product category management unit 110. The license-management DB 106 also has a product category database (DB) 391 that corresponds to the product category management unit 150. The license-management DB 106 further has a unified product database (DB) 392 that corresponds to the unified product management unit 160.

An LA# sequence number table 393 is a database that manages sequence numbers and license access numbers issued commonly to product categories managed by the product category management units 110 and 150, and the unified product management unit 160. The sequence number corresponding to each license access number issuance is managed with the LA# sequence number table 393. The LA# sequence number table 393 further stores a last sequence number 394 to be issued, and an issue date of the last sequence number (last issue date) 395.

Product Category DB 390

The product category DB 390 will be described next. The product category DB 390 has an application product information table 310 and a device product information table 320. The product category DB 390 also has a table 330 associated with the two information tables 310 and 320.

The table 330 associated with the two information tables 310 and 320 stores an application product code 331 and a device product code 332. By referring to this table, a device product on which an application product is to be installed can be associated with the application product purchased by the user.

The product category DB 390 has a function information table 340, a customer information table 350, a license access number (LA#) table 360, a license key (LKey) information table 370 and a device number information table 380.

The function information table 340 stores function IDs 341 and function names 342 for identifying the functions of a printing apparatus on which an application product is to be installed.

The application product information table 310 stores an application product code 311 for identifying an application product, a function ID 312 showing function type, a product name 313, a product overview 314, and a product registration date 315.

The LA# table 360 stores a license access number (LA#) 361, a sequence number 362 of the license access number, a product/application product code 363, and the number of registered devices 364. The LA# table 360 also stores a device serial number (DS#) 365, a user serial number 366, and a status 367 showing license validity. The LA# table 360 further stores a unified license management number 368 and license category information 369.

The license category information 369 is basic information for use when issuing a unified license key. Specifically, a predetermined code is set in the category information 369 in conjunction with the printing apparatuses on which the application is to be installed. Functions permitted of the printing apparatuses on which the application is to be installed are then controlled in accordance with this preset code when the unified license key is supplied. The unified license management number 368 is used when collectively managing licenses.

The customer information table 350 stores a user serial number 351, a business name 352, an e-mail address 353, a telephone number 354, and a name 355.

The LKey information table 370 stores a license key number (LKey#) 371, a license access number (LA#) 372, and an LA# issue date 373. The information in the LKey information table 370 is stored via the sales information management system 104.

The device product information table 320 stores a device product code 321 for uniquely identifying devices, a target model product name 322, an edit lock flag 323 indicating that content modification is prohibited depending on the issuance state of the LA#, and the like. The information in the device product information table 320 is stored via the manufacturing information management system 103.

The device number information table 380 stores a device product code 381, a sequence number 382, a data band prefix 383, a data band start number 384, a data band end number 385, and an edit lock flag 386.

Product Category DB 391

Figure 4:
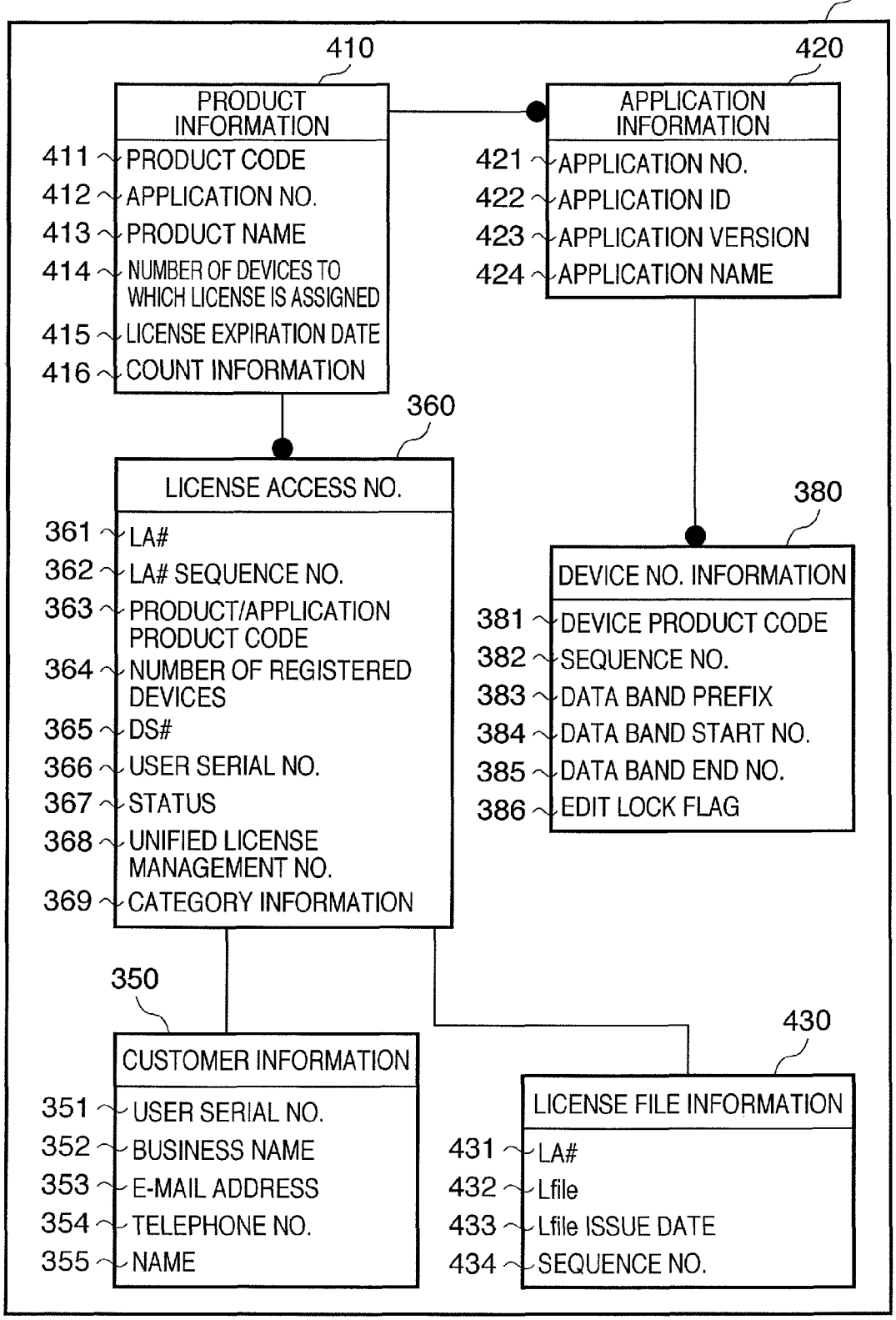
FIG. 4 shows the configuration of a product category DB 391 according to an embodiment of the present invention.

FIG. 4 shows the configuration of the product category DB 391. Note that content overlapping with the table described above with FIG. 3 will be omitted.

The product category DB 391 has an application information table 420 and an LA# table 360. The product category DB 391 has a product information table 410 that associates the two information tables 360 and 420.

The product information table 410 stores a product code 411, an application number 412, an application product name (product name) 413, the number of devices to which license is assigned 414, and information relating to license expiration date and the like.

The product category DB 391 further has a customer information table 350, a license file information table 430, and a device number information table 380.

The license file information table 430 stores a license access number (LA#) 431, a license file number (LFile#) 432, a license file issue date 433, and a sequence number 434 showing the number of times that the license file has been updated.

This sequence number 434 is used when assigning licenses to different devices. [0084] The application information table 420 stores a system management application number 421 showing a product, and an application ID 422, which is a management number for specifying an application in the printing apparatus. The application information table 420 also stores an application version 423 showing the version of the application, and an application name 424.

The LA# table 360 and the device number information table 380 are similar to the configurations in the above description of FIG. 3.

The above databases use a prepared user interface (UI) in the server, and are generated by the sales information management system 104, the manufacturing information management system 103 and the like implementing processing for product registration, modification, license access number issuance and the like.

Unified Product DB 392

Figure 5:
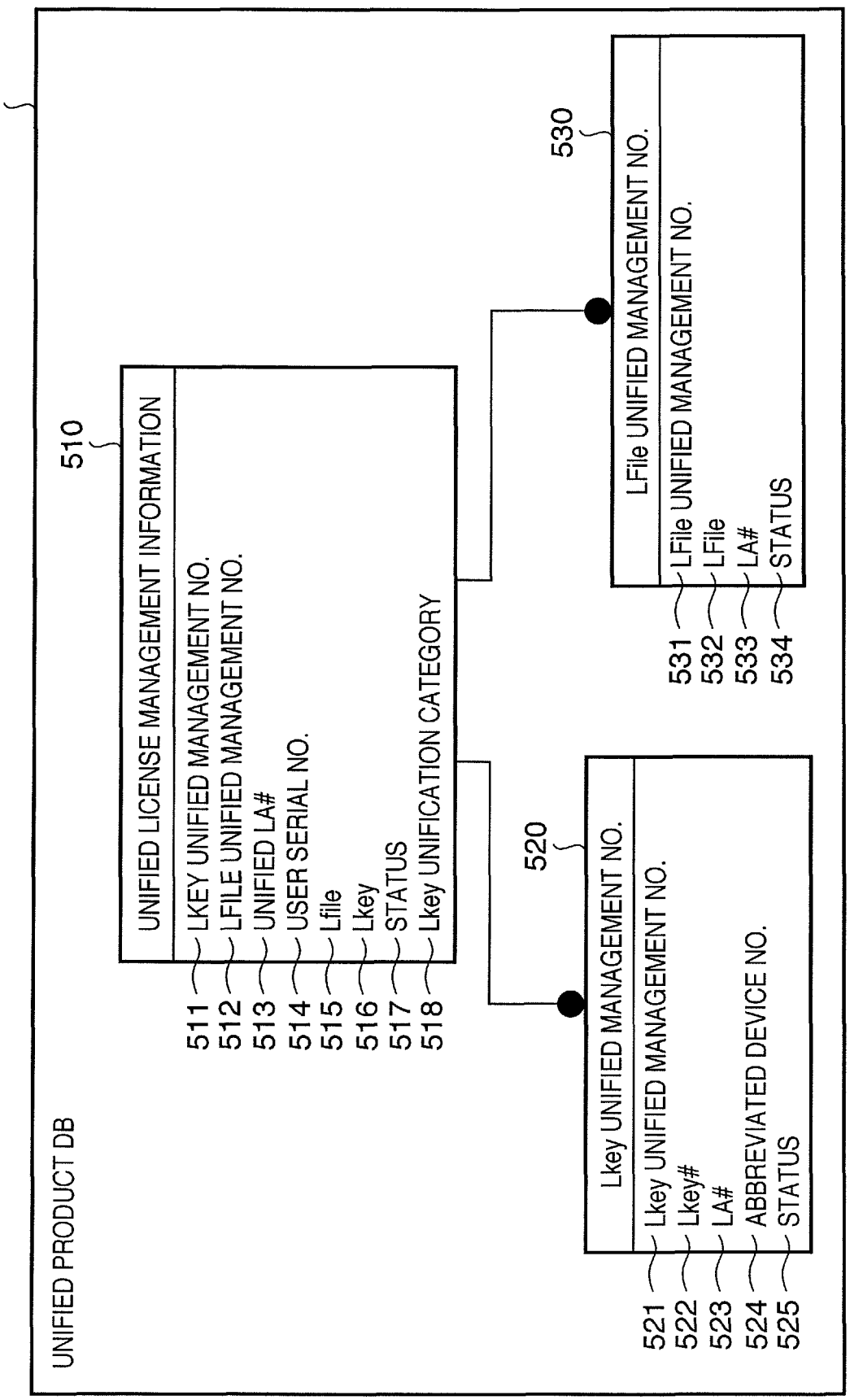
FIG. 5 shows the configuration of a unified product DB 392 according to an embodiment of the present invention.

FIG. 5 shows the configuration of the unified product DB 392. The unified product DB 392 has a license key (LKey) unified management number table 520, a license file (LFile) unified management number table 530, and a unified license management information table 510 that associates these two information tables.

The unified license management information table 510 stores a license key (LKey) unified management number 511, a license file (LFile) unified management number 512, a unified license access number (LA#) 513, and a user serial number 514. The unified license management information table 510 further stores a license file (LFile) 515 and a license key (LKey) 516, which are unified licenses, a status 517, and a license key (LKey) unification category 518.

The LKey unified management number table 520 and the LEFile unified management number table 530 are managed by the unified license management information table 510. The LKey unified management number table 520 and the LFile unified management number table 530 are mutually exclusive, and the unified license management information table 510 is controlled so as to only have one of these tables.

That is, either the LKey unified management number 511 and the LKey 516 are blank or the LFile unified management number 512 and the LFile 515 are blank. This makes the unified state robust.

The LKey unification category 518 sets a category that includes all licenses approved when issuing a unified license key, based on the category information 369.

In the present embodiment, the category is set from the perspective of retail price and marketing. Note that the category can, of course, be set from other perspectives.

For example, if the number of devices that can be unified with a single license key is four, a maximum of four license key unified management number tables 520 are created.

The unified LA# 513 is a single license access number generated when unifying licenses. The user can centrally manage unified licenses by referring to the unified LA# 513.

The LKey unified management number table 520 stores a license key unified management number 521, a license key number (LKey#) 522, a license access number (LA#) 523, an abbreviated device number 524, and a status 525. The LKey unified management number table 520 is generated if a single license key is provided for a plurality of devices.

The LKey# 522 and the LA# 523 respectively store information stored in the LKey# 371 and the LA# 372 of the LKey information table 370 in FIG. 3.

The abbreviated device number 524 stores a simplified number for specifying a device when unification has been performed. The status 525 shows the update period of the table.

The LFile unified management number table 530 stores a license file (LFile) unified management number 531, a license file number (LFile#) 532, a license access number (LA#) 533, and a status 534.

The LFile unified management number table 530 is generated if different functions are provided for a plurality of devices using a single license file.

The LFile# 532 and the LA# 533 respectively store information stored in the LFile# 432 and the LA# 431 of the license file information table 430 in FIG. 4. The status 534 shows the update period of the LFile unified management number table 530.

The license issuance process in the license-issuing unit 113 of the license-issuing server 101 will be described next.

License Key Issuance

Figure 6:
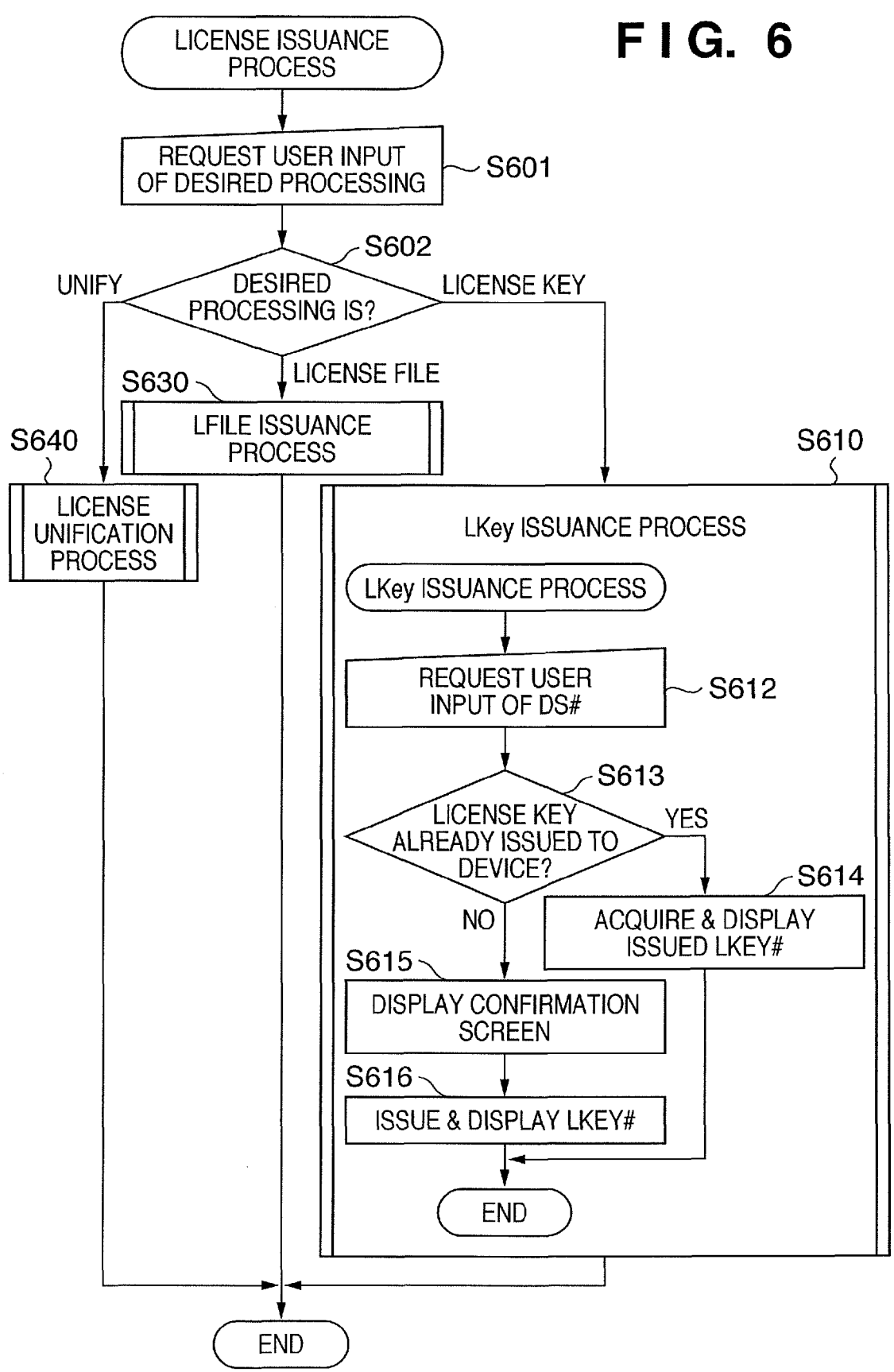
FIG. 6 is a flowchart for illustrating the processing flow in a license-issuing unit 113 according to an embodiment of the present invention.

FIG. 6 is a flowchart for illustrating the processing flow in the license-issuing unit 113. FIG. 7 shows a screen used in license issuance. The license-issuing unit 113 can manage the issuance of licenses that control the operations of devices and the functions of applications to be installed in the devices.

The user, when requesting issuance of a license, accesses a URL written on the package of a purchased application product via a browser of the user system 102. Here, a "browser" is a program for browsing contents existing on a network such as the Internet.

The license-issuing server 101 receives access from the user system 102 via the Internet 105, and transmits display data for displaying the license issuance screen (FIG. 7) to the user system 102.

A license issuance screen 700 functions as an input screen (input unit) for inputting license access information (license access number) for identifying the application in order to issue a license.

The license issuance screen 700 has a license access number (LA#) input field 701 and an Issue License button 702 for instructing that a license be issued. The license issuance screen 700 further has, for use in requesting unification process, a unified number input field 703 for determining how many license access numbers are to be unified (unified number), and a Request Unified License button 704 for requesting issuance of a unified license.

The license-issuing unit 113 can determine whether issuance of a unified license that unifies licenses enabling a plurality of devices to operate an application has been requested. The license-issuing unit 113 functions as a determining unit that determines whether issuance of a unified license is requested based on the input to the unification number input field 703 and whether the Request Unified License button 704 is pressed.

In step S601, the license-issuing server 101 waits for an input from the license issuance screen 700 as to whether a single-function license or a unified license is requested.

Here, if the Request Unified License button 704 is pressed, the license-issuing server 101 displays FIG. 7 again after adding the same number of LA# input fields 701 as the number of licenses requested for unification.

If the Issue License button 702 is pressed, the license-issuing unit 113 of the license-issuing server 101, in step S602, determines the processing to be executed based on the content of the license access number (LA#).

If the input license access number (LA#) is 1, the license-issuing unit 113 retrieves the relevant data from the LA# table 360 of the product category DB 390 or 391.

If the information corresponding to the license access number (LA#) is stored in the LKey information table 370 (FIG. 3), processing proceeds to step S610. If the information corresponding to the license access number (LA#) is stored in the license file information table 430 (FIG. 4), processing proceeds to step S630.

If judged in step S602 that a plurality of license access numbers (LA#) have been input, the license-issuing unit 113 determines that license unification has been requested, and processing proceeds to step S640.

Next, the process of issuing a license key (S610) will be described in detail.

In step S612, the license-issuing unit 113 generates a registration screen for requesting input of a device serial number, and transmits the generated display data to the user system 102.

When the user inputs a device serial number, the license-issuing unit 113, in step S613, checks the input device serial number, and determines whether a license has already been issued to the device. The license-issuing unit 113 can determine whether a license key has been issued by referring to the license key information (LKey#) 371 and the LA# issue date 373 stored in the LKey information table 370.

If determined that a license has not been issued (S613: NO), processing proceeds to step S615.

In step S615, the license-issuing unit 113 generates data for a confirmation screen for confirming the issuance of a license with the user, and transmits the generated data to the user system 102, in order to display the confirmation screen in the user system 102. If the user requests issuance of a license key via the confirmation screen, processing proceeds to step S616.

In step S616, the license-issuing unit 113 generates an encrypted license key number (LKey#) using the input device serial number, registers the encrypted LKey# in the LKey information table 370, and ends the processing.

The license-issuing unit 113 generates screen data for displaying the issued license key number (LKey#), and transmits the generated screen data to the user system 102, in order to display the issued license key number (LKey#) in the user system 102.

On the other hand, if determined in step S613 that a license key has already been issued (S613: YES), processing proceeds to step S614.

In step S614, the license-issuing unit 113 acquires the license key number (LKey#) registered in an encrypted state using the input device serial number from the database.

Further, the license-issuing unit 113 generates screen data for displaying the acquired license key number (LKey#), and transmits the generated screen data to the user system 102, in order to display the license key number (LKey#) in the user system 102.

When the license key number (LKey#) displayed in the user system 102 is input by user operation to the installation destination, which is the printing apparatus 123, for example, the functions of the application for which the license was issued become usable. Note that the license key number (LKey#) displayed in the user system 102 can also be downloaded to a specified installation destination by user operation.

The printing apparatus 123 to which the license key number (LKey#) is input determines whether the device serial number and the application number set in the printing apparatus 123 match the license key number (LKey#). If they are matched, the application can be launched on the printing apparatus 123.

The application and the printing apparatus 123 manufactured and sold can thereby be placed under the management of the license-issuing server 101.

If the license-issuing unit 113 determines in step S602 that the input license access number (LA#) is stored in the license file information table 430 (FIG. 4), processing proceeds to step S630.

In step S630, the license-issuing unit 113 executes a process for issuing a license file (LFile). This process is basically similar to the process for issuing a license key in step S610.

If determined in step S602 that a plurality of license access numbers LA# have been input, the license-issuing unit 113 determines that license unification is requested, and processing proceeds to the license unification process of step S640.

License Unification Process

The processing flow for issuing a unified license key (step S640 of FIG. 6) executed by the license-issuing unit 113 will be described in detail.

FIG. 8 is a flowchart for illustrating the detailed processing flow for unifying licenses (S640) executed by the license-issuing unit 113.

In step S801, the license-issuing unit 113 judges whether the license access numbers (LA#) to be unified that correspond to the device serial numbers input via the input screen of FIG. 9 are all new numbers. If they are license access numbers or unified license access numbers that have already been issued (S801: YES), the license-issuing unit 113 proceeds with processing to step S802.

In step S802, the license-issuing unit 113 acquires the issued license access numbers (LA#) based on the input device serial numbers.

If determined in step S801 that there are no license access numbers or unified license access numbers which have been issued (5801: NO), the license-issuing unit 113 proceeds with processing to step S803.

In step S803, the license-issuing unit 113 prepares data that combines the product category, the application product name and the application product code.

Further, in step S804, the license-issuing unit 113 generates screen data for inputting device serial numbers for acquiring the license access numbers targeted for unification, and transmits the generated screen data to the user system 102. On receipt of the screen data, the user system 102 displays a screen for inputting device serial numbers on the display apparatus.

FIG. 9 illustrates the screen for inputting a plurality of device serial numbers. The product list information (product category, application product name, application product code) created in step S803 is displayed on this screen. This screen display functions as an input unit for inputting device serial information (device serial numbers) for identifying a plurality of devices.

The license-issuing unit 113 acquires the license access numbers (LA#) to be unified, based on the plurality of device serial numbers input via this screen. If there are license access numbers that have already been issued, the corresponding license access numbers would have been acquired in the processing of step S802. In the FIG. 9 example, two input blocks 901 and 902 are provided. Device serial number input fields 911 and 914 are respectively displayed in these input blocks, and the license access numbers corresponding to the two device serial numbers input here are targeted for unification. Confirmation input fields 912 and 915 for confirming the input device serial numbers are displayed in correspondence to the device serial number input fields 911 and 914.

In the case of issuing a unified license for launching and operating the same application on a plurality of devices, the user inputs device serial numbers for identifying the plurality of devices in the input fields 911 and 914. Then, when the user presses an Issue Unified License button 913, the license-issuing unit 113 executes the following license unification process of steps S805 and below.

In step S805, the license-issuing unit 113 determines whether the devices targeted for unification are the same model, and whether the applications have the same function (hereinafter, "same model/same function").

If the determination result by the license-issuing unit 113 in step S805 is same model/same function (S805: YES), processing proceeds to step S808.

On the other hand, if the determination result in step S805 is not same model/same function (S805: NO), processing proceeds to step S806.

In step S806, the license-issuing unit 113 determines whether the devices targeted for unification are the same model, and whether the applications have different functions (hereinafter, "same model/different functions").

If the determination result by the license-issuing unit 113 in step S806 is same model/different functions (S806: YES), processing proceeds to step S809. On the other hand, if the determination result in step S806 is not same model/different functions (S806: NO), processing proceeds to step S807.

In step S807, the license-issuing unit 113 determines whether the devices targeted for unification consist of a plurality of models, and whether the applications have the same function (hereinafter, "plural models/same function").

If the determination result by the license-issuing unit 113 in step S807 is plural models/same function (SS07: YES), processing proceeds to step S810. On the other hand, if the determination result in step S807 is not plural models/same function (S807: NO), processing proceeds to step S811.

In steps S808 to S811, the license-issuing unit 113 stores the determination result (S805-S807) by setting the determination result in the status 517 of the unified license management information table 510 of the unified product DB 392. The license-issuing unit 113 issues a unified license based on a combination of the devices identified by the device serial information (numbers) and the applications identified by the license access information (numbers) based on the determination result. For example, the license-issuing unit 113 can switch the format of the unified license (license key or license file) to be issued, depending on whether the devices identified by the device serial information (numbers) are the same model or a plurality of models.

If the determination result of step S808 or S809 is set in the status 517, processing proceeds to step S821. Here, the license-issuing unit 113 issues a unified license key (LKey) and a unified license access number (LA#) based on the determination result set in the status 517.

If the determination result of step S810 or S811 is set in the status 517, processing proceeds to step S822. Here, the license-issuing unit 113 issues a unified license file (LFile) and a unified license access number (LA#) based on the determination result set in the status 517.

In step S823, the license-issuing unit 113 transmits the unified license key (LKey) and the like issued in step S821 or the unified license file (LFile) and the like issued in step S822 to the user system 102.

The license-issuing unit 113 also generates screen data for displaying the unified license key (LKey) and the like or the unified license file (LFile) and the like in the user system 102 and transmits the generated data to the user system 102.

The user system 102 receives the screen data transmitted from the license-issuing unit 113. The unified license key (LKey) and the unified license access number (LA#) or the unified license file (LFile) and the unified license access number (LA#) transmitted in step S823 are then displayed.

Figure 10:
FIG. 10 illustrates a screen displaying a unified license key and a unified license access number according to an embodiment of the present invention.

FIG. 10 illustrates a screen displaying a unified license key (LKey) 1001 and a unified license access number (LA#) 1002. A similar screen is also displayed where the unified license is a unified license file (LFile) If there are license keys or the like that have already been issued, these issued license keys or the like are displayed.

License Key Issuance Process

Figure 11:
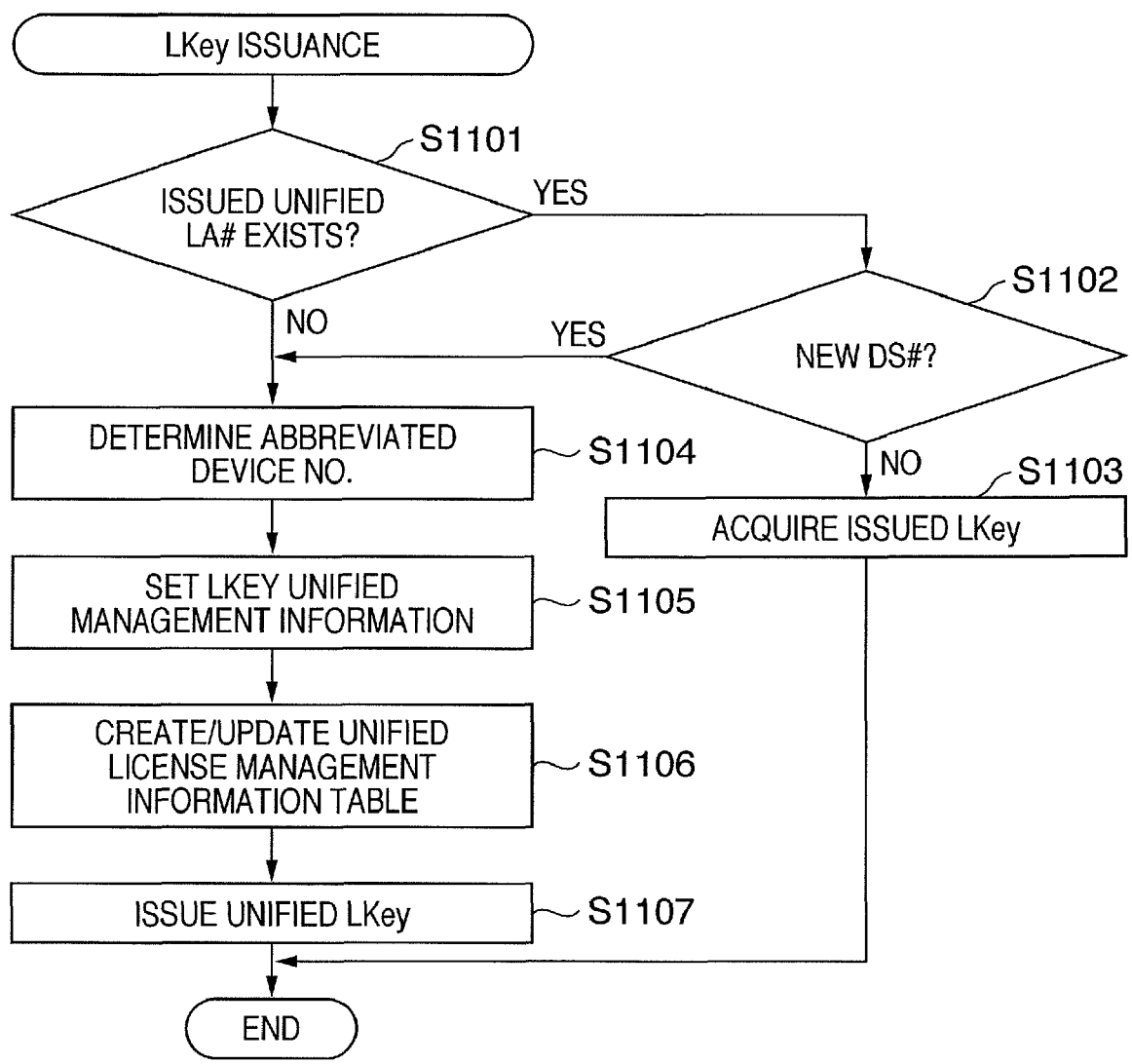
FIG. 11 is a flowchart for illustrating the processing flow for issuing a unified license key in step S821 of FIG. 8.

Next, the issuing of a license key (S821 of FIG. 8) as part of the process of issuing a unified license will be described in detail. FIG. 11 is a flowchart for illustrating the processing flow for issuing a license key in step S821.

In step S1101, the license-issuing unit 113 searches the unified LA# 513 field of the unified license management information table 510, in order to determine whether a unified license access number (LA#) has already been issued.

If the license-issuing unit 113 determines in step S1101 that a unified license access number (LA#) has already been issued (S1101: YES), and proceeds with processing to step S1102.

In step S1102, the license-issuing unit 113 searches for an LKey unified management number table 520, in order to determine whether a device serial number corresponds to the unified license access number. If an LKey unified management number table 520 exists and data is set in the abbreviated device number 524, the license-issuing unit 113 determines that the device serial number is not new (S1102: NO), and processing proceeds to step S1103.

In step S1103, the license-issuing unit 113 acquires the issued LKey 516 from the unified license management information table 510, and ends the processing.

If the license-issuing unit 113 determines in step S1101 that a unified license access number (LA#) has not been issued (S1101: NO), processing proceeds to step S1104. Also, if an abbreviated device number does not exist, the license-issuing unit 113 determines in step S1102 that the device serial number is new (S1102: YES), and processing proceeds to step 81104.

In step S1104, the license-issuing unit 113 determines an abbreviated device number for the input device serial number. This abbreviated device number is processed as a device that shares the unified license access number (LA#).

In step S1105, the license-issuing unit 113 issues a license access number (LA#) for the abbreviated device number determined in step S1104, and creates an LKey unified management number table 520. The license-issuing unit 113 then sets the abbreviated device number, the newly issued license access number (LA#) and the like (license key unified management information) in the LKey unified management number table 520.

If the unified license is newly issued, the license-issuing unit 113, in step S1106, creates or updates the unified license management information table 510, based information relating to the unified license. That is, the license-issuing unit 113 creates or updates the unified license management information table 510 in accordance with the settings in the LKey unified management number table 520. The license-issuing unit 113 newly issues a unified license access number (LA#) if a unified license access number has not been issued (S1101: NO).

In step S1107, the license-issuing unit 113 generates a unified license key (LKey).

Note that while FIG. 11 illustrates the processing flow of step S821 for issuing a unified license key, the processing flow of step 5822 for issuing a unified license file is similar. In this case, the license-issuing unit 113, in processing that corresponds to step S1105, issues a license access number (LA#) for the abbreviated device number determined in step S1104, and creates an LFile unified management number table 530. The license-issuing unit 113 then sets the abbreviated device number, the newly issued license access number (LA#) and the like (license file unified management information) in the LFile unified management number table 530.

In processing that corresponds to step S1106, the license-issuing unit 113 creates or updates the unified license management information table 510 in accordance with the settings in the LFile unified management number table 530. The license-issuing unit 113 newly issues a unified license access number (LA#) if a unified license access number has not been issued (S1101: NO).

In processing that corresponds to step 1107, the license-issuing unit 113 generates a unified license file (LFile).

Exemplary Configuration of Unified License Key

FIG. 12A shows bit information used in an exemplary unified license key. The license-issuing unit 113 can generate a unified license key by combining the bit information shown in FIG. 12A.

A license key issued by the license-issuing unit 113 includes ID information (D7, D6) showing an attribute of the license key, and control information (D5-D0) for controlling device operations and application functions.

In FIG. 12A, the two bits of bits D7 and D6 functions as ID information showing an attribute of the license key, with this information showing whether the license key is in conventional license key form (conventional) or in unified license key form (common operation). The bits DS to D0 functions as control information for controlling device operations and application functions, with this information setting the range of functions operable by the devices and applications.

FIG. 12B illustratively shows the range of functions operable by the devices and applications as a specific example of control information. If the setting in bits D5 to D0 is "0" (1201), all device operations ("ALL (categories 1, 2, 3)") and execution of the HDD utility, PDF, encryption and copy-forgery-inhibited pattern authentication functions are permitted as application functions.

If the setting in bits D5 to D0 is "1"(1202), only category 1 device operations and the HUDD utility function is permitted. If the setting in bits D5 to D0 is "2" (1203), only category 2 device operations and the HDD utility and PDP functions are permitted. If the setting in "D5-D0" is "3" (1204), only category 3 device operations and the HDD utility, PDF and encryption functions are permitted.

The license-issuing unit 113 determines the abbreviated device numbers (1 to 4) based on the device serial numbers. These numbers are determined in advance by performing the same processing in both the user system 102 and the license-issuing server 101. Sharing the same abbreviated device numbers in both the user system 102 and the license-issuing server 101 ensures that the numbers are uniformly unique. The processing executed in both the user system 102 and the license-issuing server 101 involves, for example, taking the lower-order four bits of the total eight bits of each device serial number.

The license-issuing unit 113 of the license-issuing server 101 encrypts the information shown in FIG. 12A.

The encrypted license key is transmitted from the license-issuing server 101 (license-issuing unit 113) to the user system 102. The user system 102 has a decryption key for decrypting an encrypted license key, and on receipt of a license key, the user system 102 decrypts the license key. The user system 102 then discriminates the content of the decrypted license key.

If common operation is instructed based on the information set in bits D7 and D6, the user system 102 can download the content of bits D5 to D0 in FIG. 12A for the abbreviated device numbers (1 to 4). Devices that receive download of a license key can recognize description (D5-D0) relating to device operations and application functions. The operations of devices and the functions of installed applications are controlled based on respective recognition results.

FIGS. 14A and 14B show variations of the unified LKey configuration shown in FIG. 12A. FIG. 14A shows an example in which the bit restriction placed on the descriptive field (Byte2, 3) of the abbreviated device numbers in FIG. 12A has been relaxed, allowing the device serial numbers (DS#) to be described in detail.

Sharing the same device serial numbers (DS#) in both the user system 102 and the license-issuing server 101 ensures that the numbers are uniformly unique. Holding the input device serial numbers in the user system 102 without modification in the license-issuing server 101, for example, enables the device serial numbers to be accurately identified without being abbreviated.

FIG. 14B shows an exemplary configuration in which control information is set in correspondence to the abbreviated device numbers in Byte2 to Byte5, rather than being set in bits D5 to D0 of Byte1 as shown in FIG. 12A. Configuring the unified license key as shown in FIG. 14B enables the license key to be set for each abbreviated device using different control information.

The license-issuing unit 113 is able to control device operations and application functions by modifying the configuration of unified license keys, as shown in FIGS. 12A, 14A and 14B.

Exemplary Configuration of Unified License File

FIG. 13 illustrates the configuration of a unified license file (LFile) resulting from the processing in step S822 of FIG. 8. The unified license file (LFile) is constituted by combinations of application IDs and device serial numbers (DS#). The unified license file contains a combination of applications having the same or different functions with respect to a plurality of device models.

When issuing a unified license file, the license-issuing unit 113 of the license-issuing server 101 encrypts the unified license file using an encryption key and transmits the encrypted unified license file to the user system 102. The user system 102, on receiving the encrypted unified license file, decrypts the unified license file using a decryption key for decrypting the encrypted file.

The user system 102 can download the decrypted unified license file to devices (printing apparatuses 123, 124 and 125 in the case of FIG. 1). Devices that receive the unified license file search the device serial numbers (DS#) in the unified license file, and if a number that matches the device serial number set in a particular device is retrieved, that device is permitted to launch the application identified by the corresponding application ID.

As described above, the present embodiment enables license keys and license files to be issued in unified form according to device model and application function.

The present embodiment also enables both the time required to input data due to manual management and input errors to be eliminated by downloading unified license keys and unified license files to devices.

Further, the present embodiment enables device operations and application functions to be controlled by modifying the configuration of unified license keys.

Second Embodiment

A second embodiment of the present invention will be described next with reference to the flowchart of FIG. 15. FIG. 15 is a flowchart for illustrating the processing flow for issuing a unified license key according to the second embodiment. The same step reference numerals are attached to processing that is the same as FIG. 11 described in the first embodiment, and related description will be omitted to avoid redundancy.

In step S1102, the license-issuing unit 113 searches for an LKey unified management number table 520, in order to determine whether a device serial number corresponds to the unified license access number. If an LKey unified management number table 520 does not exist and there is no data set in the abbreviated device number 524, the license-issuing unit 113 determines that the device serial number is new and processing proceeds to step S1501.

In step S1501, the license-issuing unit 113 determines whether the issued license key has been returned from the user system 102. If the issued license key has not been returned (S1501: NO), processing proceeds to step S1502.

In step S1502, the license-issuing unit 113 executes error processing. The license-issuing unit 113 generates input screen data for returning the license key, and transmits the generated input screen data to the user system 102, in order to display a license return input screen (not shown) on the display apparatus of the user system 102.

Once the license key has been correctly input via the license return input screen and transmitted to the license-issuing server 101, the license is no longer valid in a device.

When the license-issuing server 101 has received return of the license key (S1501: YES), processing proceeds to step S1503.

In step S1503, the license-issuing unit 113 deletes information relating to the returned unified license from the unified license management information table 510 and the LKey unified management number table 520. The license-issuing unit 113 can then update the unified license management information table 510 and the LKey unified management number table 520. The license-issuing unit 113 deletes information in the unified license management information table 510 and the LKey unified management number table 520 relating to the returned license key. The license-issuing unit 113 can then create a new LKey unified management number table 520 corresponding to a device serial number that is newly added, and update the unified license management information table 510 based on the content of the newly created table 520.

The present embodiment is able to issue a unified license after reconfiguring a license key that has already been issued. Thus, license keys can be easily unified when a large number of devices are purchased or when existing devices are replaced.

Other Embodiments

Note that the objects of the present invention may, of course, be achieved by supplying a storage medium on which software program code for realizing the functions of the aforementioned embodiments is recorded to a system or an apparatus. The objects of the present invention may also, of course, be achieved by a computer (or CPU, MPU) in the system or apparatus reading and executing the program code stored on the storage medium.

In this case, the storage medium storing the program code embodies the present invention as a result of the program code read from the storage medium itself realizing the functions of the aforementioned embodiments.

Storage media that can be used to supply the program code include, for example, flexible disk, hard disk, optical disk, magneto optical disk, CD-ROM, CD-R, nonvolatile memory card, and ROM.

The functions of the aforementioned embodiments may be realized by a computer executing the read program code. Needless to say, the present invention includes the case where an operating system (OS) or the like running on a computer performs part or all of the actual processing based on instructions in the program code, and the aforementioned embodiments are realized as a result of this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-205314, filed Jul. 27, 2006, which is hereby incorporated by reference herein in its entirety.

What is claimed is:

1. An information processing method for managing issuance of a license that controls an operation of a device of a user system and a function of an application to be installed in the device, comprising:
   an application information input step of inputting license access information from the user system for identifying the application in order to issue the license;
   a determining step of determining whether issuance of a unified license that unifies licenses for making the application operable in a plurality of devices is requested;
   a displaying step of displaying a screen provided in the user system for inputting device information, the screen indicating input fields respectively corresponding to the plurality of the devices, if it is determined in the determination step that issuance of the unified license is requested;
   a device information input step of inputting the device information from the screen of the user system for identifying the plurality of devices;
   a license issuing step of issuing a unified license including control information of the application for the plurality of devices, based on a combination of the plurality of devices identified by the device information and the application identified by the license access information, if it is determined in the determining step that issuance of the unified license is requested, and
   a transmitting step of transmitting the unified license to the user system,
   wherein as a format of the unified license to be issued either a unified license file or a unified license key number is exclusively issued in the license issuing step, corresponding to whether the devices identified by the device information are the same model or different models.

2. An information processing method according to claim 1, wherein as a format of the unified license to be issued, a unified license key number is issued in the licensing step when the plurality of devices identified by the device information are the same model and the application identified by the license access information is an application having the same function or when the plurality of devices identified by the device information are the same model and the application identified by the license access information is an application having different functions, and a unified license file is issued in the license issuing step when the plurality of devices identified by the device information are different models and the application identified by the license access information is an application having the same function or when the plurality of devices identified by the device information are different models and the application identified by the license access information is an application having different functions.

3. An information processing method according to claim 1, further comprising a generating step of generating a management information table for managing the unified license,
   wherein if the unified license is newly issued in the license issuing step, the management information table is updated in the generating step based on information relating to the unified license.

4. An information processing method according to claim 1, further comprising a return reception step of receiving return of the unified license from the user system,
   wherein if return of the unified license is received in the return reception step, the management information table is updated in the generating step by deleting information relating to the returned unified license from the management information table.

5. An information processing system having a license server for managing issuance of a license that controls an operation of a device of a user system and a function of an application to be installed in the device, the user system is connected to the license server, comprising:
   an application information input unit provided in the user system and programmed to input of license access information for identifying the application in order to issue the license;
   a determining unit provided in the license server and programmed to determine whether issuance of a unified license that unifies licenses for making the application operable in a plurality of devices is requested;
   a displaying unit provided in the user system for displaying a screen for inputting device information, the screen indicating input fields respectively corresponding to the plurality of the devices, if it is determined by the determination unit that issuance of the unified license is requested;
   a device information input unit provided in the user system and programmed to input of device information for identifying the plurality of devices;
   a license-issuing unit provided in the license server and programmed to issue a unified license including control information of the application for the plurality of devices, based on a combination of the plurality of devices identified by the device information and the application identified by the license access information, if it is determined by the determining unit that issuance of the unified license is requested, and
   a transmitting unit provided in the license server and programmed to transmit the license to the user system,
   wherein as a format of the unified license to be issued either a unified license file or a unified license key number is exclusively issued in the license issuing unit, corresponding to whether the devices identified by the device information are the same model or different models.

6. An information processing system according to claim 5, wherein as a format of the unified license to be issued either a unified license file or the unified license key number is selectively issued by the license-issuing unit, depending on whether the devices identified by the device information are the same model or different models.

7. An information processing system according to claim 5, further comprising a generating unit provided in the licensing server and programmed to generate a management information table for managing the unified license,
   wherein if the unified license is newly issued by the license-issuing unit, the management information table is updated by the generating unit based on information relating to the unified license.

8. An information processing system according to claim 5, further comprising a return reception unit provided in the licensing server and programmed to receive return of the unified license from the user system by the user,
   wherein if return of the unified license is received by the return reception unit, the management information table is updated by the generating unit by deleting information relating to the returned unified license from the management information table.

9. A method according to claim 1, wherein the device information is device serial information.

10. An information processing system according to claim 5, wherein the device information is device serial information.

11. A computer readable storage medium encoded with a computer program for implementing an information processing method for managing issuance of a license that controls an operation of a device and a function of an application to be installed in the device, the method comprising:
- an application information input step of inputting license access information for identifying the application in order to issue the license;
- a determining step of determining whether issuance of a unified license that unifies licenses for making the application operable in a plurality of devices is requested;
- a displaying step of displaying a screen provided in a user system for inputting device information, the screen indicating input fields respectively corresponding to the plurality of the devices;
- a device information input step of inputting device information for identifying the plurality of devices; and
- a license issuing step of issuing a unified license key number including control information of the application for the plurality of devices, based on a combination of the plurality of devices identified by the device information and the application identified by the license access information, if it is determined in the determining step that issuance of the unified license is requested, wherein as a format of the unified license to be issued either a unified license file or a unified license key number is exclusively issued in the license issuing step, corresponding to whether the devices identified by the device information are the same model or different models.

* * * * *